United States Patent
Chen et al.

(10) Patent No.: US 12,227,147 B2
(45) Date of Patent: Feb. 18, 2025

(54) ROCKER FOOTBOARD DEVICE AND VEHICLE

(71) Applicant: WINBO—Dongjian Automotive Technology Co., Ltd., Guangdong (CN)

(72) Inventors: Yongbo Chen, Guangdong (CN); Peiquan Lai, Guangdong (CN); Yongxin Liang, Guangdong (CN); Jie Yang, Guangdong (CN)

(73) Assignee: WINBO-Dongjian Automotive Technology Co., Ltd., Foshan (CN)

( * ) Notice: Subject to any disclaimer, the term of this patent is extended or adjusted under 35 U.S.C. 154(b) by 360 days.

(21) Appl. No.: 17/889,408

(22) Filed: Aug. 17, 2022

(65) Prior Publication Data

US 2023/0150435 A1 May 18, 2023

Related U.S. Application Data

(63) Continuation-in-part of application No. PCT/CN2021/133818, filed on Nov. 29, 2021.

(30) Foreign Application Priority Data

Nov. 15, 2021 (CN) .......................... 202111351509.7

(51) Int. Cl.
*B60R 3/02* (2006.01)
(52) U.S. Cl.
CPC ...................... *B60R 3/02* (2013.01)
(58) Field of Classification Search
CPC .................. B60R 3/02; B60R 3/002
See application file for complete search history.

(56) References Cited

U.S. PATENT DOCUMENTS

| | | | | |
|---|---|---|---|---|
| 1,129,956 A | * | 3/1915 | Chapman | B60R 3/02 |
| | | | | 105/449 |
| 3,387,906 A | * | 6/1968 | Edwards | A47B 88/497 |
| | | | | 312/334.25 |
| 2010/0320714 A1 | * | 12/2010 | Webb | B60R 3/02 |
| | | | | 280/166 |
| 2020/0023780 A1 | * | 1/2020 | Du | B60R 3/002 |

FOREIGN PATENT DOCUMENTS

CN 203211208 U 9/2013

OTHER PUBLICATIONS

Zhihong Sun et al., Mechanical Principles Course Design, Mar. 31, 2015, pp. 11-12, Donghua University Press.

\* cited by examiner

*Primary Examiner* — Bryan A Evans

(57) ABSTRACT

Disclosed are a rocker footboard device and a vehicle. The rocker footboard device includes a mounting seat, a rotary driving device, a first connecting rod, a second connecting rod, a sliding sleeve, and a footboard, where the rotary driving device is provided with a driving shaft, the sliding sleeve is pivotally connected with the mounting seat through a second pivot shaft, and a middle segment of the second connecting rod is slidably provided on the sliding sleeve. The rotary driving device drives the first connecting rod to rotate around the driving shaft, and the first connecting rod drives the second connecting rod to slide in the sliding sleeve. As a result, the second connecting rod is extended or retracted, thereby extending or retracting the footboard. Compared with the four-rod linkage mechanism, the rocker footboard device has the simpler structure, smaller size, lower manufacturing cost, and higher production efficiency.

20 Claims, 4 Drawing Sheets

ROCKER FOOTBOARD DEVICE AND VEHICLE

CROSS REFERENCE TO RELATED APPLICATIONS

The present application is a Continuation-In-Part application of PCT Application No. PCT/CN2021/133818 filed on Nov. 29, 2021, which claims the benefit of Chinese Patent Application No. 202111351509.7 filed on Nov. 15, 2021. All the above are hereby incorporated by reference in their entirety.

TECHNICAL FIELD

The present disclosure relates to a technical field of vehicle accessories, and in particular to a rocker footboard device and a vehicle including same.

BACKGROUND

A vehicle footboard is provided under a vehicle door for people to get on or off the vehicle. There have been two types of mainstream footboards, including a fixed footboard (namely the position of the footboard on a vehicle is fixed), and an electric lifting footboard (namely the footboard is extended under driving of a motor when needed, but retracted and concealed under the vehicle door when not used). The mainstream electric footboard is extended or retracted by driving a four-rod linkage mechanism through the motor. However, the four-rod linkage mechanism has a high manufacturing cost, and under a same occupied space, the four-rod linkage mechanism has small travel and a low universality.

SUMMARY

An objective of the present disclosure provides a rocker footboard device, to solve problems of high manufacturing cost and small travel of an extending and retracting mechanism of the footboard in the prior art.

To achieve the above objective, a first aspect of the present disclosure provides a rocker footboard device, including: a mounting seat, a rotary driving device arranged on the mounting seat, a first connecting rod, a second connecting rod, a sliding sleeve, and a footboard, where the rotary driving device is provided with a driving shaft; the first connecting rod includes a first end fixedly connected with the driving shaft, and a second end pivotally connected with a first end of the second connecting rod through a first pivot shaft; the footboard is provided at a second end of the second connecting rod; the sliding sleeve is pivotally connected with the mounting seat through a second pivot shaft; a middle segment of the second connecting rod is slidably provided on the sliding sleeve; and an axis of the driving shaft, an axis of the first pivot shaft, and an axis of the second pivot shaft are parallel to one another.

Preferably, a distance between the axis of the driving shaft and the axis of the first pivot shaft may be a first distance; a distance between the axis of the driving shaft and the axis of the second pivot shaft may be a second distance; and the first distance may be less than the second distance.

Preferably, the rotary driving device may be provided at an underside of the mounting seat, the underside of the mounting seat may be provided with a hinge seat, the second pivot shaft may be pivotally connected on the hinge seat, and the driving shaft may be higher than the second pivot shaft.

Preferably, the rocker footboard device may further include: a stop block, where the stop block may be located between the driving shaft and the second pivot shaft, an upper end of the stop block may be connected with the mounting seat, and a lower side of the stop block may be provided with an abutting portion abutting against the second connecting rod.

Preferably, the abutting portion may be provided with an abutting surface abutting against the second connecting rod, and the abutting surface may be matched with an outer side of the second connecting rod in shape.

Preferably, when the second connecting rod abuts against the abutting surface, the second end of the second connecting rod may be extended, and an upper side of the footboard may keep horizontal.

Preferably, the mounting seat may be provided with a plurality of mounting holes.

Preferably, the second end of the second connecting rod may be provided with a bending portion which may bend upward, and the footboard may be provided on the bending portion.

Preferably, a friction texture may be provided at the upper side of the footboard.

A second aspect of the present disclosure provides a vehicle, including: a vehicle body, and the above rocker footboard device, where the vehicle body is provided with a chassis; the mounting seat is provided at a bottom of the chassis; and the rotary driving device, the first connecting rod, and the second connecting rod are located under the chassis.

The rocker footboard device and the vehicle including same provided by the present disclosure achieve the following beneficial effects: The rotary driving device of the rocker footboard device drives the first connecting rod to rotate around the driving shaft, and the first connecting rod drives the second connecting rod to slide in the sliding sleeve. As a result, the second connecting rod is extended or retracted, thereby extending the footboard when the footboard is needed, or retracting the footboard when the footboard is not used. Compared with the four-rod linkage mechanism, the rocker footboard device has the simpler structure, fewer parts, smaller size, lower manufacturing cost, and higher production efficiency. Moreover, under a same occupied space, the crank rocker mechanism formed by the first connecting rod, the second connecting rod and the sliding sleeve has larger travel, allowing for greater convenience in adjusting the travel of the footboard, and a stronger universality.

Additional aspects and advantages of the present disclosure will be partly provided in the following description, and partly become evident in the following description or understood through the practice of the present disclosure.

Figure 1:
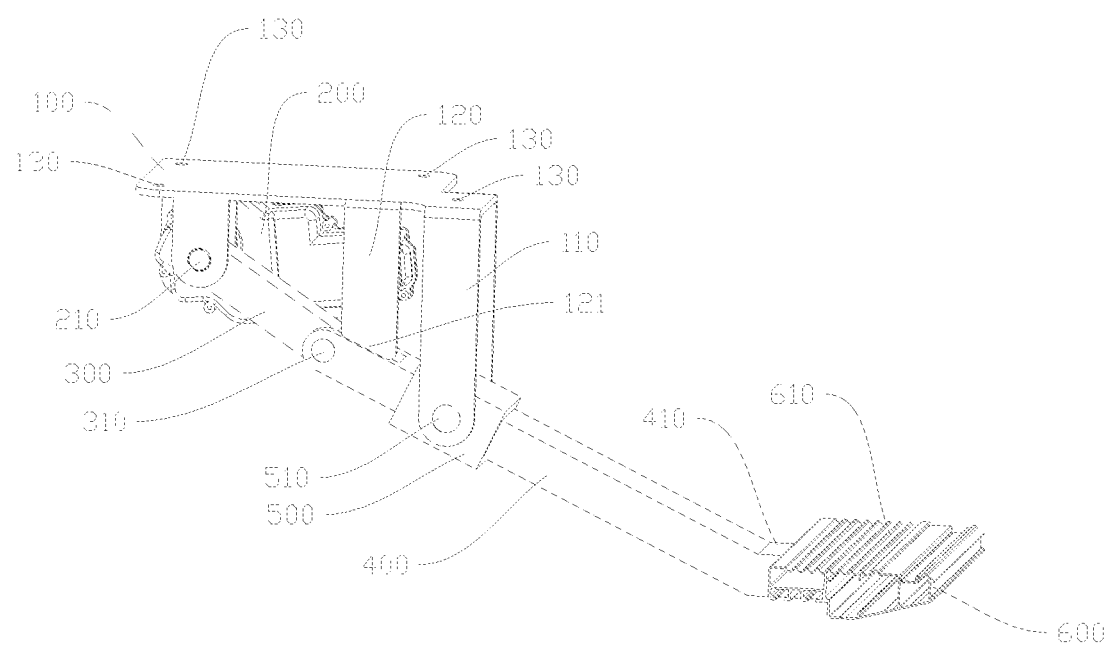
FIG. 1 is a schematic structural view of a rocker footboard device according to an embodiment in a first aspect of the present disclosure.

100: mounting seat, 110: hinge seat, 120: stop block, 121: abutting portion, 122: abutting surface, 130: mounting hole, 200: rotary driving device, 210: driving shaft, 300: first connecting rod, 310: first pivot shaft, 400: second connecting rod, 410: bending portion, 500: sliding sleeve, 510: second pivot shaft, 600: footboard, 610: friction texture, 700: first distance, 800: second distance, 16: vehicle body, and 17: chassis.

DETAILED DESCRIPTION

The embodiments of the present disclosure are described below in detail. Examples of the embodiments are shown in the drawings. The same or similar numerals represent the same or similar elements or elements having the same or similar functions throughout the specification. The embodiments described below with reference to the drawings are exemplary. They are only used to explain the present disclosure, and should not be construed as a limitation to the present disclosure.

In the description of the present disclosure, it should be understood that orientational or positional relationships indicated by terms such as "upper", "lower", "front", "rear", "left", "right", "top", "bottom", "inside" and "outside" are based on the drawings. These terms are merely intended to facilitate and simplify the description of the present disclosure, rather than to indicate or imply that the mentioned device or components must have a specific orientation or must be constructed and operated in a specific orientation. Therefore, these terms should not be understood as a limitation to the present disclosure.

In the description of the present disclosure, "several" means a number larger than one, while "a plurality of" means a number larger than two; "greater than", "less than", "over" and the like are construed as not including the number, and "above", "below", "within" and the like are construed as including the number. The "first" and "second" in the description are merely intended to distinguish technical features, and cannot be construed as indicating or implying relative importance or implicitly indicating a number of indicated technical features or implicitly indicating a sequence relationship of the indicated technical features.

In the description of the present disclosure, unless otherwise explicitly defined, the words such as "arrange", "install" and "connect" should be understood in a broad sense, and those skilled in the technical field can reasonably determine the specific meanings of the above words in the present disclosure in combination with specific contents of the technical solutions.

Figure 2:
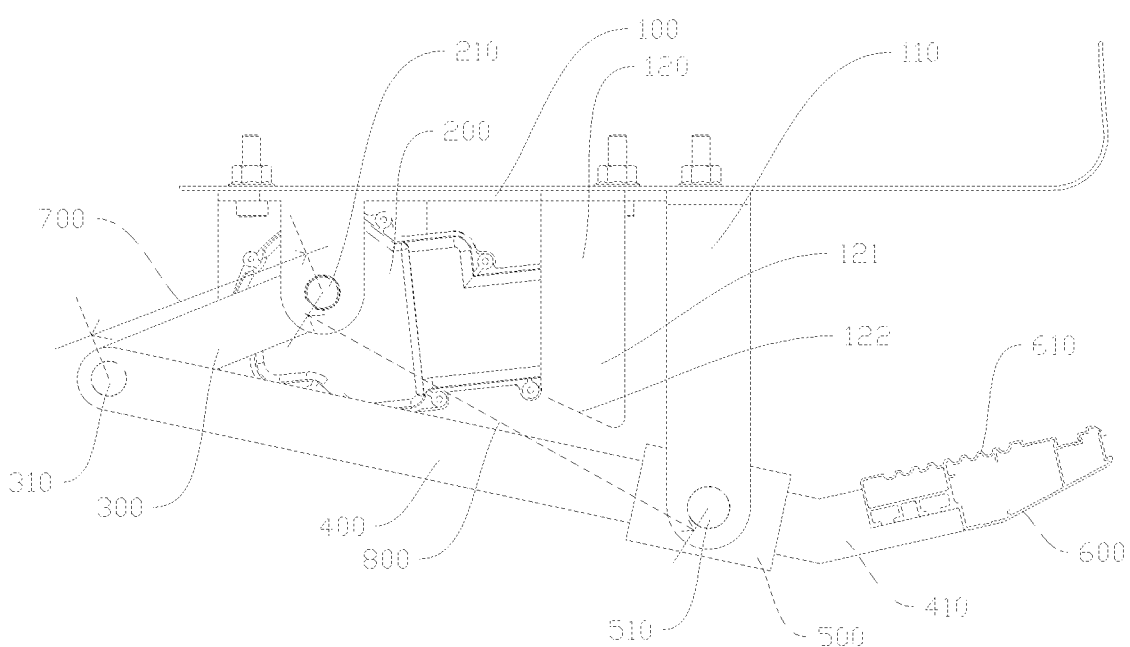
FIG. 2 is a schematic structural view of a second connecting rod in a retracted state according to an embodiment in the first aspect of the present disclosure.
Figure 3:
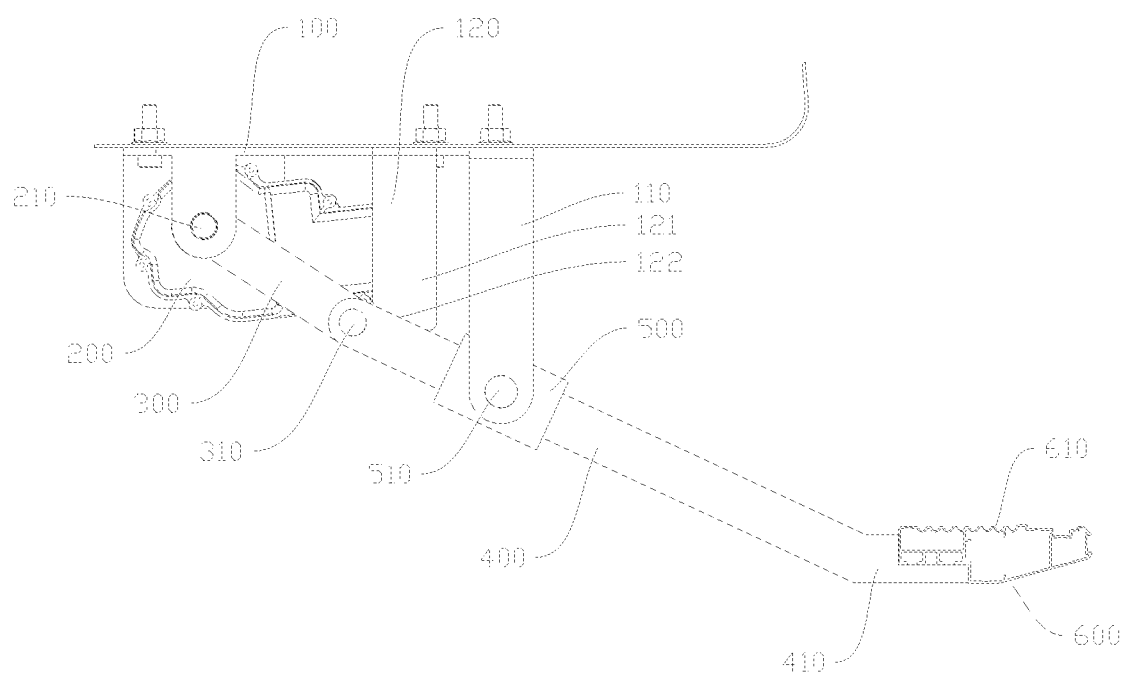
FIG. 3 is a schematic structural view of a second connecting rod in an extended state according to an embodiment in the first aspect of the present disclosure.

Referring to FIG. 1 to FIG. 3, descriptions are now made to a rocker footboard device provided by an embodiment of the present disclosure.

As shown in FIG. 1, the rocker footboard device in the embodiment of the present disclosure includes a mounting seat 100, a rotary driving device 200 arranged on the mounting seat 100, a first connecting rod 300, a second connecting rod 400, a sliding sleeve 500, and a footboard 600. The rotary driving device 200 is provided with a driving shaft 210. The first connecting rod 300 includes a first end fixedly connected with the driving shaft 210, and a second end pivotally connected with a first end of the second connecting rod 400 through a first pivot shaft 310. The footboard 600 is provided at a second end of the second connecting rod 400. The sliding sleeve 500 is pivotally connected with the mounting seat 100 through a second pivot shaft 510. A middle segment of the second connecting rod 400 is slidably provided on the sliding sleeve 500. An axis of the driving shaft 210, an axis of the first pivot shaft 310, and an axis of the second pivot shaft 510 are parallel to one another. A sliding channel is formed in the sliding sleeve 500, and the second connecting rod 400 is slidably provided in the sliding channel, such that the second connecting rod 400 can be slidably connected with the sliding sleeve 500.

The first connecting rod 300, the second connecting rod 400 and the sliding sleeve 500 are formed into a crank rocker mechanism. The rotary driving device 200 drives the first connecting rod 300 to rotate around the driving shaft 210, and the first connecting rod 300 drives the second connecting rod 400 to slide in the sliding channel of the sliding sleeve 500. As a result, the second connecting rod 400 can be extended or retracted relative to the sliding sleeve 500, thereby extending the footboard 600 when the footboard 600 is needed, or retracting the footboard 600 when the footboard 600 is not used. Referring to FIG. 3, when the first connecting rod 300 swings toward a direction close to the second pivot shaft 510, the first connecting rod 300 drives the second end of the second connecting rod 400 to extend toward a direction away from the second pivot shaft 510, thereby extending the footboard 600 at the second end of the second connecting rod 400 outward. Referring to FIG. 2, when the first connecting rod 300 swings toward the direction away from the second pivot shaft 510, the first connecting rod 300 drives the second end of the second connecting rod 400 to gradually get close to the second pivot shaft 510, thereby retracting the footboard 600. The crank rocker mechanism formed by the first connecting rod 300, the second connecting rod 400 and the sliding sleeve 500 can adjust the travel of the second connecting rod 400 through the length of the first connecting rod 300. The longer the first connecting rod 300, the larger the travel extended or retracted by the second connecting rod 400 under a same swing amplitude of the first connecting rod 300. Therefore, the travel extended or retracted by the second connecting rod 400 is adjusted conveniently.

Generally, the four-rod linkage mechanism is a parallelogram mechanism. To increase the travel, two swing rods need to be made longer, which greatly expands the traversing area of the swing rods. However, the crank rocker mechanism formed by the first connecting rod 300, the second connecting rod 400 and the sliding sleeve 500 can adjust the travel of the second connecting rod 400 through the length of the first connecting rod 300, namely the travel can be increased by only adjusting the length of the first connecting rod 300. Compared with the four-rod linkage mechanism, the traversing area is reduced, and the crank rocker mechanism has a wider travel adjustment range.

According to the rocker footboard device in the embodiment, the rotary driving device 200 drives the first connecting rod 300 to rotate around the driving shaft 210, and the first connecting rod 300 drives the second connecting rod 400 to slide in the sliding sleeve 500. As a result, the second connecting rod 400 is extended or retracted, thereby extending the footboard 600 when the footboard 600 is needed, or retracting the footboard 600 when the footboard 600 is not used. Compared with the four-rod linkage mechanism, the rocker footboard device has the simpler structure, fewer parts, smaller size, lower manufacturing cost, and higher production efficiency. Moreover, under a same occupied space, the crank rocker mechanism formed by the first connecting rod 300, the second connecting rod 400 and the sliding sleeve 500 has larger travel, allowing for greater convenience in adjusting the travel of the footboard 600, and a stronger universality.

It is to be noted that the rotary driving device 200 is a driving motor, and may also be a pneumatic motor or a hydraulic motor.

In a preferred embodiment of the present disclosure, referring to FIG. 2 and FIG. 3, a distance between the axis of the driving shaft 210 and the axis of the first pivot shaft 310 is a first distance 700, and a distance between the axis of the driving shaft 210 and the axis of the second pivot shaft 510 is a second distance 800. The first distance 700 is less than the second distance 800. That is, the rotational radius of the first connecting rod 300 is less than the second distance 800, which prevents the second end of the second connecting rod 400 from moving toward the rotary driving device 200, reduces the intervention, and makes the second connecting rod 400 extended or retracted more smoothly.

In a preferred embodiment of the present disclosure, referring to FIG. 1 and FIG. 2, the rotary driving device 200 is provided at an underside of the mounting seat 100, the underside of the mounting seat 100 is provided with a hinge seat 110, the second pivot shaft 510 is pivotally connected on the hinge seat 110, and the driving shaft 210 is higher than the second pivot shaft 510. That is, the driving shaft 210, the first pivot shaft 310 and the second pivot shaft 510 are located under the mounting seat 100, and the second pivot shaft 510 is located under the driving shaft 210, such that when the first connecting rod 300 rotates, the second connecting rod 400 is extended downward, the footboard 600 is extended downward obliquely, and thus the user gets on or off the vehicle conveniently.

In a preferred embodiment of the present disclosure, referring to FIG. 1 and FIG. 2, the rocker footboard device further includes: a stop block 120. The stop block 120 is located between the driving shaft 210 and the second pivot shaft 510. An upper end of the stop block 120 is connected with the mounting seat 100, and a lower side of the stop block 120 is provided with an abutting portion 121 abutting against the second connecting rod 400. As shown in FIG. 3, when the second connecting rod 400 is extended under the driving of the first connecting rod 300, the stop block 120 abuts against the second connecting rod 400. In this case, the stop block 120 is configured to prevent the second connecting rod 400 from moving upward continuously and the first connecting rod 300 from rotating offside, and the stop block 120 applies a downward force to the second connecting rod 400. When getting on the vehicle, the user needs to step on the footboard 600, with a downward force applied to the second end of the second connecting rod 400. In this case, the stop block 120 supports the first end of the second connecting rod 400, which prevents the second connecting rod 400 from swinging around the second pivot shaft 510, fixes the footboard 600, and prevents the footboard 600 from moving when the user gets on or off the vehicle.

In a preferred embodiment of the present disclosure, referring to FIG. 1 and FIG. 2, the abutting portion 121 is provided with an abutting surface 122 abutting against the second connecting rod 400. The abutting surface 122 is matched with an outer side of the second connecting rod 400 in shape. Since the abutting surface 122 is matched with the outer side of the second connecting rod 400 in shape, the abutting surface 122 abuts against the outer side of the second connecting rod 400 better, the abutting area is increased, the pressure is reduced, and the second connecting rod 400 is not broken. For example, when the second connecting rod 400 is a round rod, the abutting surface 122 is a cylindrical surface. When the second connecting rod 400 is a square rod, the abutting surface 122 is a plane with the matched shape, such that the abutting surface 122 is better attached to the second connecting rod 400.

In a preferred embodiment of the present disclosure, referring to FIG. 2 and FIG. 3, when the second connecting rod 400 abuts against the abutting surface 122, the second end of the second connecting rod 400 is extended, and an upper side of the footboard 600 keeps horizontal. That is, when the second connecting rod 400 is extended under the driving of the first connecting rod 300 and abuts against the abutting surface 122, the upper side of the footboard 600 keeps horizontal. With the horizontal upper side of the footboard 600, the user can step on the footboard more stably, and get on or off the vehicle conveniently.

In a preferred embodiment of the present disclosure, referring to FIG. 1, the mounting seat 100 is provided with a plurality of mounting holes 130. The mounting seat 100 can be mounted on the vehicle body via bolts passing through the mounting holes 130. Therefore, the mounting seat 100 is mounted conveniently, the rocker footboard device is provided on the vehicle body conveniently, and the mounting efficiency is improved.

In a preferred embodiment of the present disclosure, referring to FIG. 1 and FIG. 2, the second end of the second connecting rod 400 is provided with a bending portion 410 which bends upward, and the footboard 600 is provided on the bending portion 410. With the bending portion 410, the angle of the footboard 600 can be adjusted, and the upper side of the extended footboard 600 can keep horizontal for ease of use.

In a preferred embodiment of the present disclosure, referring to FIG. 1 and FIG. 2, a friction texture 610 is provided at the upper side of the footboard 600. With the friction texture 610, the frictional force at the upper side of the footboard 600 can be increased, and the user does not slip and fall when getting on or off the vehicle.

Figure 4:
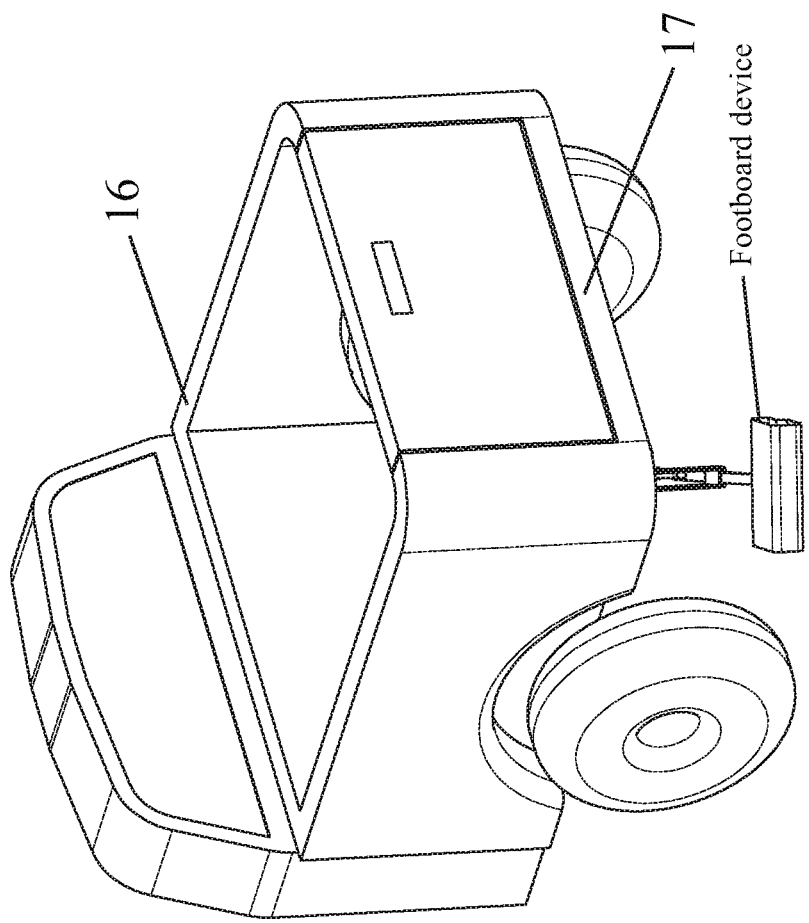
FIG. 4 is a schematic structural view of an installation structure of a vehicle and a rocker footboard device in an embodiment of the present invention.

Referring to FIG. 4, an embodiment of the present disclosure further provides a vehicle, including a vehicle body 16, and the above rocker footboard device. The vehicle body 16 is provided with a chassis 17. The mounting seat 100 is provided at a bottom of the chassis 17. The rotary driving device 200, the first connecting rod 300, and the second connecting rod 400 are located under the chassis 17. The rocker footboard device is provided on the chassis 17 of the vehicle body 16, located under a vehicle door, and configured for a user to get on or off the vehicle conveniently. The rocker footboard device does not have to be located on a specific position of the vehicle body 16, but can be any position where the rocker footboard device is required. The rotary driving device 200 of the rocker footboard device drives the first connecting rod 300 to rotate around the driving shaft 210, and the first connecting rod 300 drives the second connecting rod 400 to slide in the sliding sleeve 500. As a result, the second connecting rod 400 is extended or retracted, thereby extending the footboard 600 when the footboard 600 is needed, or retracting the footboard 600 when the footboard 600 is not used. Compared with the four-rod linkage mechanism, the rocker footboard device has the simpler structure, fewer parts, smaller size, lower manufacturing cost, and higher production efficiency. Moreover, under a same occupied space, the crank rocker mechanism formed by the first connecting rod 300, the second connecting rod 400 and the sliding sleeve 500 has larger travel, allowing for greater convenience in adjusting the travel of the footboard 600, and a stronger universality.

The above are only preferred implementations of the present disclosure. It should be noted that several improvements and replacements may further be made by those of ordinary skill in the art without departing from the technical principle of the present disclosure, and such improvements and replacements should also be deemed as falling within the protection scope of the present disclosure.

The invention claimed is:

1. A rocker footboard device, comprising: a mounting seat, a rotary driving device arranged on the mounting seat, a first connecting rod, a second connecting rod, a sliding sleeve, and a footboard, wherein
the rotary driving device is provided with a driving shaft; the first connecting rod comprises a first end fixedly connected with the driving shaft, and a second end pivotally connected with a first end of the second connecting rod through a first pivot shaft; the footboard is provided at a second end of the second connecting rod; the sliding sleeve is pivotally connected with the mounting seat through a second pivot shaft; a middle segment of the second connecting rod is slidably provided on the sliding sleeve; and an axis of the driving shaft, an axis of the first pivot shaft, and an axis of the second pivot shaft are parallel to one another.

2. The rocker footboard device according to claim 1, wherein a distance between the axis of the driving shaft and the axis of the first pivot shaft is a first distance; a distance between the axis of the driving shaft and the axis of the second pivot shaft is a second distance; and the first distance is less than the second distance.

3. The rocker footboard device according to claim 2, wherein the rotary driving device is provided at an underside of the mounting seat, the underside of the mounting seat is provided with a hinge seat, the second pivot shaft is pivotally connected on the hinge seat, and the driving shaft is higher than the second pivot shaft.

4. The rocker footboard device according to claim 3, further comprising: a stop block, wherein the stop block is located between the driving shaft and the second pivot shaft, an upper end of the stop block is connected with the mounting seat, and a lower side of the stop block is provided with an abutting portion abutting against the second connecting rod.

5. The rocker footboard device according to claim 4, wherein the abutting portion is provided with an abutting surface abutting against the second connecting rod, and the abutting surface is matched with an outer side of the second connecting rod in shape.

6. The rocker footboard device according to claim 5, wherein when the second connecting rod abuts against the abutting surface, the second end of the second connecting rod is extended, and an upper side of the footboard keeps horizontal.

7. The rocker footboard device according to claim 1, wherein the mounting seat is provided with a plurality of mounting holes.

8. The rocker footboard device according to claim 1, wherein the second end of the second connecting rod is provided with a bending portion which bends upward, and the footboard is provided on the bending portion.

9. The rocker footboard device according to claim 4, wherein the second end of the second connecting rod is provided with a bending portion which bends upward, and the footboard is provided on the bending portion.

10. The rocker footboard device according to claim 1, wherein a friction texture is provided at the upper side of the footboard.

11. A vehicle, comprising: a vehicle body, and the rocker footboard device according to claim 1, wherein the vehicle body is provided with a chassis; the mounting seat is provided at a bottom of the chassis; and the rotary driving device, the first connecting rod, and the second connecting rod are located under the chassis.

12. A vehicle, comprising: a vehicle body, and the rocker footboard device according to claim 2, wherein the vehicle body is provided with a chassis; the mounting seat is provided at a bottom of the chassis; and the rotary driving device, the first connecting rod, and the second connecting rod are located under the chassis.

13. A vehicle, comprising: a vehicle body, and the rocker footboard device according to claim 3, wherein the vehicle body is provided with a chassis; the mounting seat is provided at a bottom of the chassis; and the rotary driving device, the first connecting rod, and the second connecting rod are located under the chassis.

14. A vehicle, comprising: a vehicle body, and the rocker footboard device according to claim 4, wherein the vehicle body is provided with a chassis; the mounting seat is provided at a bottom of the chassis; and the rotary driving device, the first connecting rod, and the second connecting rod are located under the chassis.

15. A vehicle, comprising: a vehicle body, and the rocker footboard device according to claim 5, wherein the vehicle body is provided with a chassis; the mounting seat is provided at a bottom of the chassis; and the rotary driving device, the first connecting rod, and the second connecting rod are located under the chassis.

16. A vehicle, comprising: a vehicle body, and the rocker footboard device according to claim 6, wherein the vehicle body is provided with a chassis; the mounting seat is provided at a bottom of the chassis; and the rotary driving device, the first connecting rod, and the second connecting rod are located under the chassis.

17. A vehicle, comprising: a vehicle body, and the rocker footboard device according to claim 7, wherein the vehicle body is provided with a chassis; the mounting seat is provided at a bottom of the chassis; and the rotary driving device, the first connecting rod, and the second connecting rod are located under the chassis.

18. A vehicle, comprising: a vehicle body, and the rocker footboard device according to claim 8, wherein the vehicle body is provided with a chassis; the mounting seat is provided at a bottom of the chassis; and the rotary driving device, the first connecting rod, and the second connecting rod are located under the chassis.

19. A vehicle, comprising: a vehicle body, and the rocker footboard device according to claim 9, wherein the vehicle body is provided with a chassis; the mounting seat is provided at a bottom of the chassis; and the rotary driving device, the first connecting rod, and the second connecting rod are located under the chassis.

20. A vehicle, comprising: a vehicle body, and the rocker footboard device according to claim 10, wherein the vehicle body is provided with a chassis; the mounting seat is provided at a bottom of the chassis; and the rotary driving device, the first connecting rod, and the second connecting rod are located under the chassis.

* * * * *